United States Patent
Menon (10) Patent No.: US 11,693,928 B2
(45) Date of Patent: *Jul. 4, 2023

(54) SYSTEM AND METHOD FOR CONTROLLING CONTENT UPLOAD ON A NETWORK

(71) Applicant: VERIZON PATENT AND LICENSING INC., Basking Ridge, NJ (US)

(72) Inventor: Satish Menon, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

This patent is subject to a terminal disclaimer.

(21) Appl. No.: 16/740,808

(22) Filed: Jan. 13, 2020

(65) Prior Publication Data

US 2020/0151486 A1 May 14, 2020

Related U.S. Application Data (63) Continuation of application No. 12/024,572, filed on Feb. 1, 2008, now Pat. No. 10,552,701.

(51) Int. Cl.
| | |
|---|---|
| *G06F 21/10* | (2013.01) |
| *G06F 21/16* | (2013.01) |
| *G06V 10/25* | (2022.01) |
| *H04L 9/40* | (2022.01) |

(52) U.S. Cl.
CPC ............ *G06F 21/10* (2013.01); *G06F 21/16* (2013.01); *G06V 10/25* (2022.01); *G06V 2201/09* (2022.01); *G06V 2201/10* (2022.01); *H04L 63/1408* (2013.01)

(58) Field of Classification Search
None
See application file for complete search history.

(56) References Cited

U.S. PATENT DOCUMENTS

| | | | | |
|---|---|---|---|---|
| 5,594,796 A | * | 1/1997 | Grube | .................. H04L 9/3297 380/270 |
| 5,864,241 A | * | 1/1999 | Schreck | ................. G01N 17/00 324/210 |
| 5,933,498 A | * | 8/1999 | Schneck | ................. G06F 21/71 705/54 |

(Continued)

OTHER PUBLICATIONS

Mourad et al (Securing Digital Content) (Year: 2007).*
Chong et al (Reducing Unauthorized Content Distribution with Monitoring ) (Year: 2007).*

*Primary Examiner* — Mamon Obeid (57) ABSTRACT

A system and method for protecting copyright in content distributed online, in combination with specified business rules. A portion of content presented for upload on a network is analyzed to detect an image associated with a content owner; the image is compared with reference images to identify the content owner; and business rules are applied to control unauthorized uploading of the content. The identifier may be a logo included in the content as a digital graphic, or a non-visual marker. Analysis is advantageously performed on a sample of video frames or a segment of preselected length. If the content is found to be copyrighted, and the attempted upload is unauthorized, uploading may or may not be permitted, and the user may or may not be charged a fee for subsequent access to the content.

19 Claims, 6 Drawing Sheets

(56) References Cited

U.S. PATENT DOCUMENTS

| | | | | |
|---|---|---|---|---|
| 6,105,006 A * | 8/2000 | Davis | G06Q 20/108 | 705/40 |
| 6,173,332 B1 * | 1/2001 | Hickman | H04L 67/01 | 709/249 |
| 6,314,408 B1 * | 11/2001 | Salas | G06F 16/958 | 707/E17.116 |
| 6,314,425 B1 * | 11/2001 | Serbinis | G06Q 10/10 | 709/224 |
| 6,343,323 B1 * | 1/2002 | Kalpio | G06Q 20/102 | 705/40 |
| 6,681,233 B1 * | 1/2004 | Ichikawa | H04L 63/10 | 707/999.203 |
| 6,898,299 B1 * | 5/2005 | Brooks | G06V 40/11 | 340/5.82 |
| 7,043,473 B1 * | 5/2006 | Rassool | G06F 16/683 | |
| 7,155,679 B2 * | 12/2006 | Bandaru | G10L 17/22 | 715/738 |
| 7,184,571 B2 * | 2/2007 | Wang | H04N 1/32315 | 713/176 |
| 7,260,555 B2 * | 8/2007 | Rossmann | H04L 63/105 | 705/50 |
| 7,299,498 B2 * | 11/2007 | Lee | G06Q 30/06 | 380/201 |
| 7,428,591 B2 * | 9/2008 | Stebbings | H04L 63/04 | 713/180 |
| 7,613,427 B2 * | 11/2009 | Blight | H04L 67/52 | 455/67.11 |
| 7,788,481 B2 * | 8/2010 | Bik | H04L 63/0227 | 713/153 |
| 7,895,311 B1 * | 2/2011 | Juenger | H04L 63/102 | 709/227 |
| 7,937,588 B2 * | 5/2011 | Picard | H04N 1/32154 | 726/32 |
| 7,945,924 B2 * | 5/2011 | Li | H04L 43/04 | 380/231 |
| 8,040,883 B2 * | 10/2011 | Keeler | H04L 41/12 | 370/389 |
| 8,122,488 B2 * | 2/2012 | Hoch | H04L 63/10 | 705/14.1 |
| 8,230,149 B1 * | 7/2012 | Long | G06F 21/85 | 710/305 |
| 8,286,241 B1 * | 10/2012 | Yeo | H04L 63/101 | 726/22 |
| 8,411,897 B2 * | 4/2013 | Srinivasan | G10L 19/018 | 382/100 |
| 8,583,039 B2 * | 11/2013 | Kammer | H04W 8/005 | 709/227 |
| 8,645,279 B2 * | 2/2014 | Schmelzer | G06F 21/60 | 709/217 |
| 8,925,106 B1 * | 12/2014 | Steiner | G06F 21/6245 | 726/28 |
| 9,037,676 B1 * | 5/2015 | Lundh | G06F 16/00 | 709/217 |
| 9,097,544 B2 * | 8/2015 | Dhanani | G01S 5/0295 | |
| 9,165,125 B2 * | 10/2015 | Zarei | G06Q 10/101 | |
| 10,552,701 B2 * | 2/2020 | Menon | G06F 21/16 | |
| 2001/0003195 A1 * | 6/2001 | Kajimoto | H04N 7/17318 | 348/E7.071 |
| 2001/0051996 A1 * | 12/2001 | Cooper | H04L 63/0823 | 705/26.1 |
| 2002/0032905 A1 * | 3/2002 | Sherr | H04L 63/12 | 725/38 |
| 2002/0114489 A1 * | 8/2002 | Ripley | G11B 20/00884 | |
| 2002/0141584 A1 * | 10/2002 | Razdan | G06F 21/10 | 705/53 |
| 2002/0164023 A1 * | 11/2002 | Koelle | G06F 21/577 | 705/51 |
| 2002/0165811 A1 * | 11/2002 | Ishii | G06Q 40/00 | 705/26.1 |
| 2002/0169971 A1 * | 11/2002 | Asano | H04L 9/3273 | 713/193 |
| 2002/0194499 A1 * | 12/2002 | Audebert | H04L 63/0853 | 726/35 |
| 2003/0007662 A1 * | 1/2003 | Kaars | G06T 1/0028 | 382/100 |
| 2003/0076955 A1 * | 4/2003 | Alve | G11B 20/00768 | 705/57 |
| 2003/0110131 A1 * | 6/2003 | Alain | G06Q 20/3674 | 705/51 |
| 2003/0120601 A1 * | 6/2003 | Ouye | H04L 63/105 | 705/51 |
| 2003/0233462 A1 * | 12/2003 | Chien | G06F 21/10 | 713/160 |
| 2004/0015445 A1 * | 1/2004 | Heaven | H04L 63/0428 | 705/51 |
| 2004/0073925 A1 * | 4/2004 | Kinoshita | H04N 21/2343 | 348/E7.071 |
| 2004/0107368 A1 * | 6/2004 | Colvin | G06F 21/121 | 726/30 |
| 2004/0117631 A1 * | 6/2004 | Colvin | G06F 21/121 | 713/179 |
| 2004/0117644 A1 * | 6/2004 | Colvin | G06F 21/121 | 713/193 |
| 2004/0117664 A1 * | 6/2004 | Colvin | G06F 21/121 | 726/30 |
| 2004/0133797 A1 * | 7/2004 | Arnold | G06F 21/10 | 713/193 |
| 2004/0186993 A1 * | 9/2004 | Risan | G11B 20/00695 | |
| 2004/0194100 A1 * | 9/2004 | Nakayama | G06F 21/64 | 718/100 |
| 2004/0243634 A1 * | 12/2004 | Levy | G06F 21/10 | |
| 2005/0027999 A1 * | 2/2005 | Pelly | G06F 21/62 | 713/194 |
| 2005/0070248 A1 * | 3/2005 | Gaur | H04W 12/08 | 455/410 |
| 2005/0097059 A1 * | 5/2005 | Shuster | G06Q 30/06 | 705/59 |
| 2005/0102381 A1 * | 5/2005 | Jiang | H04W 12/084 | 707/E17.005 |
| 2005/0154681 A1 * | 7/2005 | Schmelzer | G06F 21/60 | 705/67 |
| 2005/0175180 A1 * | 8/2005 | Venkatesan | H04L 1/0057 | 380/268 |
| 2005/0280876 A1 * | 12/2005 | Wang | H04N 1/32315 | 358/3.28 |
| 2005/0283611 A1 * | 12/2005 | Wang | H04N 1/32315 | 713/176 |
| 2006/0010075 A1 * | 1/2006 | Wolf | G06Q 30/06 | 705/57 |
| 2006/0062426 A1 * | 3/2006 | Levy | H04N 21/8358 | 348/E7.071 |
| 2006/0149727 A1 * | 7/2006 | Viitaharju | G06F 21/10 | 707/999.005 |
| 2006/0161635 A1 * | 7/2006 | Lamkin | G06F 16/16 | 709/217 |
| 2006/0239503 A1 * | 10/2006 | Petrovic | H04L 9/002 | 380/54 |
| 2006/0272031 A1 * | 11/2006 | Ache | H04N 21/6334 | 348/E7.071 |
| 2007/0011242 A1 * | 1/2007 | McFarland | G06F 11/36 | 709/205 |
| 2007/0033408 A1 * | 2/2007 | Morten | H04L 63/1408 | 713/176 |
| 2007/0044639 A1 * | 3/2007 | Farbood | G10H 1/0025 | 84/609 |
| 2007/0078773 A1 * | 4/2007 | Czerniak | G06Q 30/00 | 705/57 |
| 2007/0203841 A1 * | 8/2007 | Maes | H04L 63/104 | 705/52 |
| 2007/0233875 A1 * | 10/2007 | Raghav | G06Q 10/107 | 709/227 |
| 2007/0234291 A1 * | 10/2007 | Ronen | G06F 8/36 | 717/120 |
| 2007/0239869 A1 * | 10/2007 | Raghav | H04L 51/043 | 709/224 |
| 2007/0255652 A1 * | 11/2007 | Tumminaro | G06Q 20/3229 | 455/466 |

(56) References Cited

U.S. PATENT DOCUMENTS

| | | | |
|---|---|---|---|
| 2008/0037880 A1* | 2/2008 | Lai | H04N 19/64 375/240 |
| 2008/0046915 A1* | 2/2008 | Haeuser | H04N 7/17318 348/E7.071 |
| 2008/0062456 A1* | 3/2008 | Matsunoshita | G03G 15/5087 358/1.15 |
| 2008/0091681 A1* | 4/2008 | Dwivedi | G06F 21/554 707/999.009 |
| 2008/0270307 A1* | 10/2008 | Olson | G06F 21/10 705/51 |
| 2008/0289006 A1* | 11/2008 | Hock | H04L 67/1076 709/225 |
| 2009/0165031 A1* | 6/2009 | Li | H04N 21/4532 725/22 |
| 2009/0171970 A1* | 7/2009 | Keefe | G06Q 50/06 |
| 2009/0196465 A1* | 8/2009 | Menon | G06F 21/10 382/118 |
| 2009/0286509 A1* | 11/2009 | Huber | H04L 63/0853 455/410 |
| 2010/0138365 A1* | 6/2010 | Hirvela | H04L 63/126 709/217 |
| 2010/0199327 A1* | 8/2010 | Keum | H04N 21/4788 709/217 |
| 2010/0223472 A1* | 9/2010 | Alvarsson | G06F 21/10 713/176 |
| 2010/0235277 A1* | 9/2010 | Van Rensburg | G06Q 20/102 705/40 |
| 2011/0208761 A1* | 8/2011 | Zybura | G06F 16/1774 707/769 |
| 2011/0213665 A1* | 9/2011 | Joa | G06Q 40/00 705/14.72 |
| 2012/0066346 A1* | 3/2012 | Virmani | G06F 16/164 709/219 |
| 2012/0209852 A1* | 8/2012 | Dasgupta | G06F 16/353 707/E17.089 |
| 2012/0215747 A1* | 8/2012 | Wang | H04L 67/5682 707/769 |
| 2013/0046761 A1* | 2/2013 | Soderberg | G06F 16/48 707/736 |
| 2013/0060661 A1* | 3/2013 | Block | G06Q 30/06 726/28 |
| 2013/0074046 A1* | 3/2013 | Sharma | G06F 11/3692 717/126 |
| 2013/0144968 A1* | 6/2013 | Berger | G06Q 50/01 709/217 |
| 2013/0236010 A1* | 9/2013 | Schultz | H04N 21/4344 380/200 |
| 2014/0006486 A1* | 1/2014 | Bintliff | H04L 51/222 709/203 |
| 2014/0115720 A1* | 4/2014 | Yi | G06F 21/10 726/27 |
| 2014/0237467 A1* | 8/2014 | Heddleston | G06F 8/60 717/176 |
| 2015/0020153 A1* | 1/2015 | Jang | G06F 21/6272 726/1 |
| 2016/0253670 A1* | 9/2016 | Kim | G06Q 20/386 705/72 |
| 2017/0237829 A1* | 8/2017 | Kirkeby | G06Q 20/29 709/219 |
| 2018/0054438 A1* | 2/2018 | Li | H04L 63/0876 |
| 2018/0101678 A1* | 4/2018 | Rosa | G06F 21/32 |
| 2018/0211236 A1* | 7/2018 | Rutherford | G06Q 20/40145 |
| 2019/0057115 A1* | 2/2019 | Liu | G06F 21/10 |
| 2019/0097975 A1* | 3/2019 | Martz | H04L 63/0281 |
| 2020/0151486 A1* | 5/2020 | Menon | G06F 21/10 |
| 2021/0258395 A1* | 8/2021 | Saito | H04N 21/41422 |

* cited by examiner

SYSTEM AND METHOD FOR CONTROLLING CONTENT UPLOAD ON A NETWORK

CROSS REFERENCE TO RELATED APPLICATION

This application is a continuation of, and claims priority from co-pending U.S. patent application Ser. No. 12/024,572, filed Feb. 1, 2008, which is incorporated herein by reference.

FIELD OF THE DISCLOSURE

This disclosure relates to determining the source of audio or video content available on a network (e.g. the Internet), and using that information to enforce copyright protection and/or business rules for that content.

BACKGROUND OF THE DISCLOSURE

Many people upload copyrighted content to websites without authorization. Websites generally build costly safeguards into their infrastructure to prevent (or minimize) copyright infringement.

SUMMARY OF THE DISCLOSURE

The present disclosure provides a system and method for protecting copyright in content distributed online, in combination with specified business rules. In accordance with an aspect of the disclosure, this is done by analyzing a portion of content presented for upload on a network to detect an image associated with a content owner; comparing a detected image with a set of reference images to identify the owner of the content; and applying business rules to control unauthorized uploading of the content. This image may be a logo of the content owner included in the content as a digital online graphic. Alternatively, the image may be a human face appearing in a video, with the analysis including an automated face recognition procedure. In a case where the content comprises a video, the analysis is advantageously performed on a sample of video frames, or on a segment having a preselected length.

The comparison between the detected image and the reference images may include determining a degree of coincidence between the detected image and a reference image; if the degree of coincidence meets a predetermined criterion, a requirement for additional analysis of the image (e.g. human inspection) may be reported.

The application of business rules may include comparing an identifier of a user presenting the content with a set of authorized user identifiers associated with the content owner; permitting uploading of the content if the user is determined to be authorized; and disposing of the content if the user is determined to be unauthorized. If the user is unauthorized, uploading by that user may still be permitted with the user being charged a fee for subsequent access to the uploaded content.

In accordance with another aspect of the disclosure, a system includes a server configured to implement a method with the above-described features.

The system and method disclosed herein provide a simple, effective way to identify content from the content owners who provide explicit visual cues or non-visual markers so that downstream receivers of the content can use content analysis techniques to determine the form of the content and then to implement appropriate business rules.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

An embodiment will be described below in which video content includes a digital on-line graphic, which serves as a logo for the content owner. It will be appreciated, however, that professionally produced content typically has numerous features (both visual and aural) which may serve as effective identifiers for the content owner, and therefore function as a logo for the owner.

Figure 1:
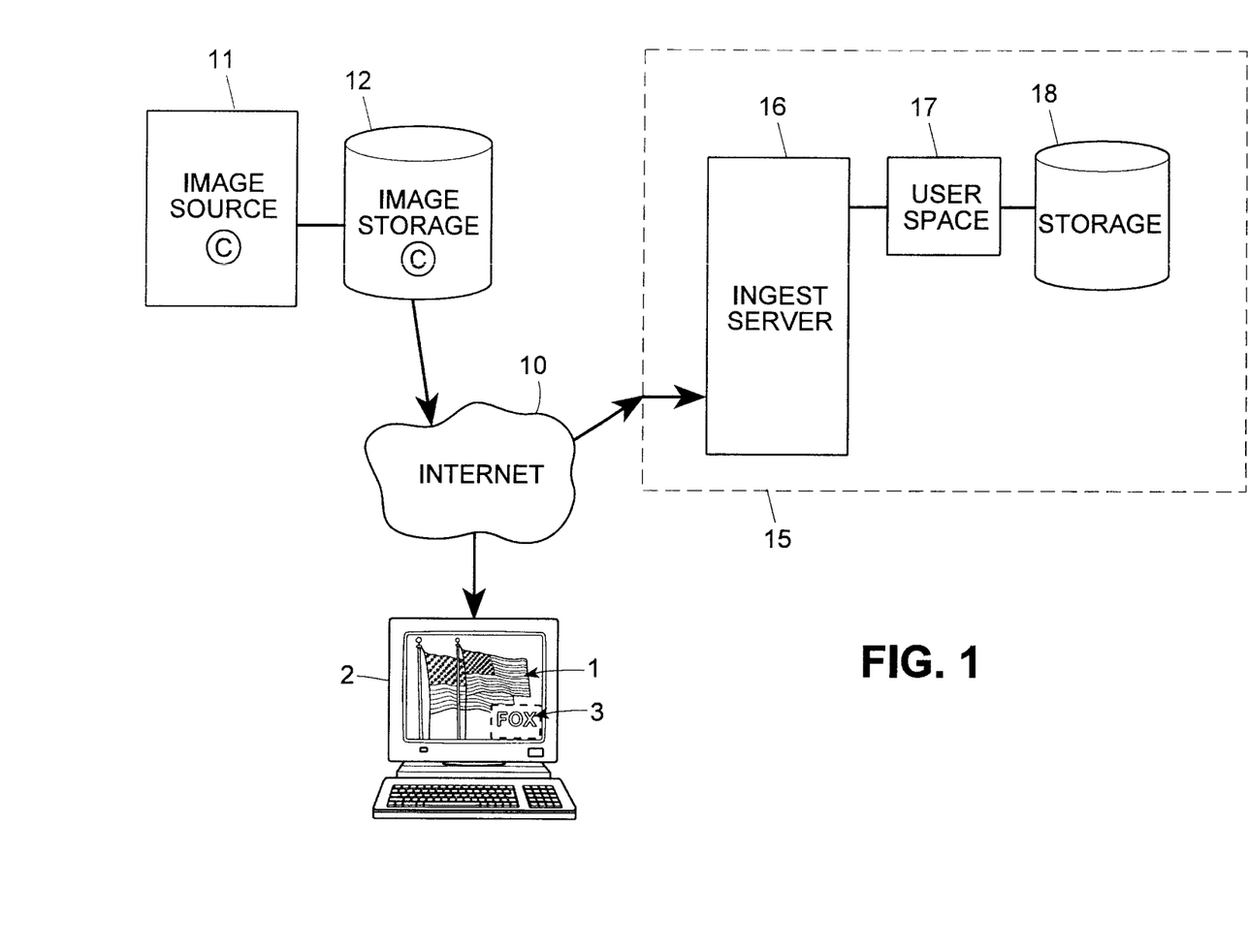
FIG. 1 is a schematic diagram of a system in which a user may download copyrighted content having a logo.

FIG. 1 schematically illustrates downloading of video content 1 to a user device 2 (typically a personal computer). The user of the device sends a request for image content via the Internet 10. The image source 11 may be a publisher or distributor of movies, TV shows, photographs or the like. The image source 11 retrieves the image from a storage device 12 and makes it available for download by the user. The content includes a logo 3 (typically a semi-transparent shape in the lower right corner of the display). The content 1 is typically protected by copyright, so that the user is authorized to view the content but not retain a copy of it. However, in the absence of suitable detection software for copyrighted content, the user still is able to upload the content to a user space 17, accessible via a network 15 maintained by an online application provider such as Yahoo!®, and store the content in storage 18. Typically the content is sent by the user via the Internet to an ingest server 16 of the network 15. It will be appreciated that the video source 11 and storage 12 may themselves be part of network 15.

Figure 2:
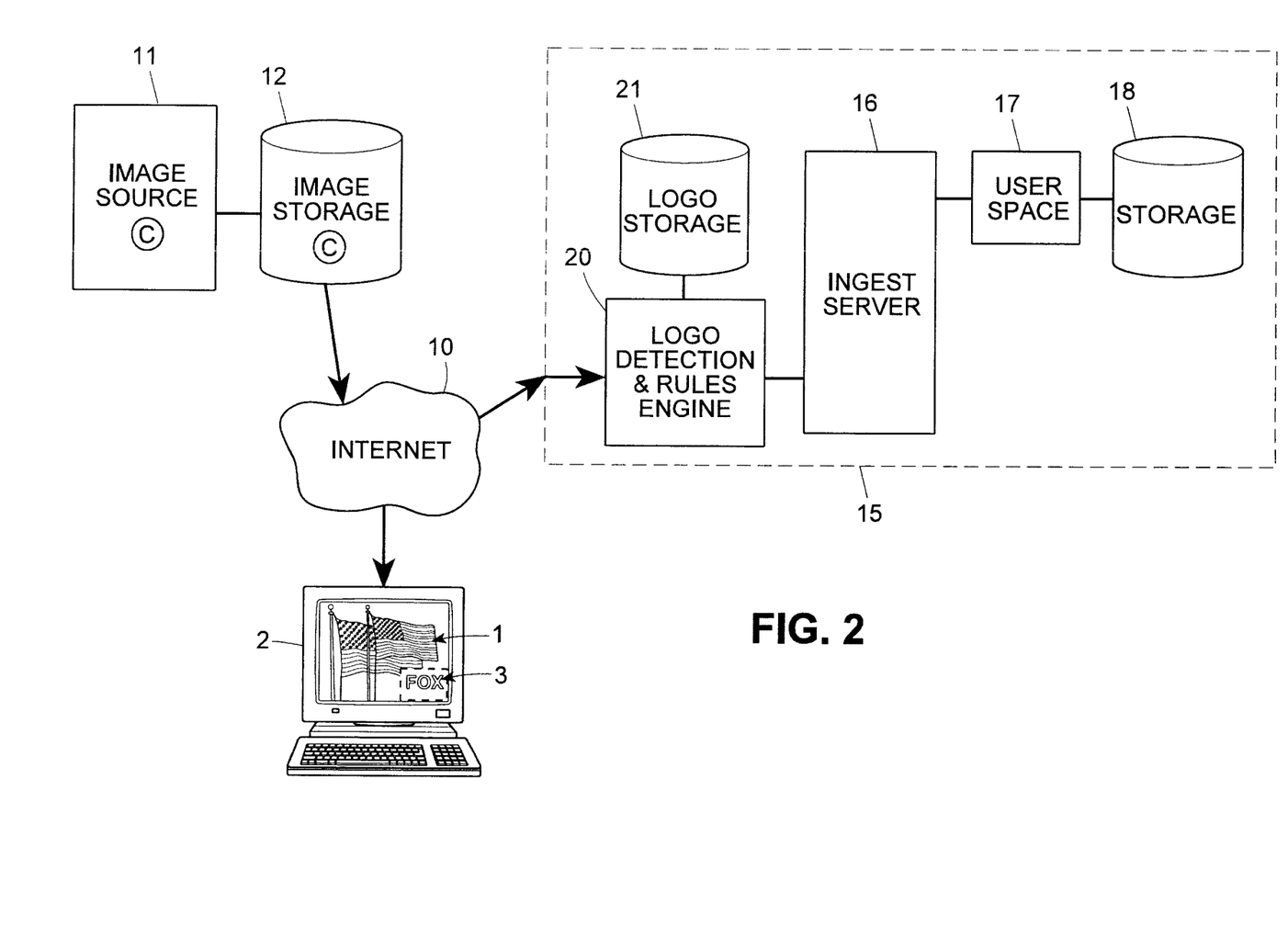
FIG. 2 schematically illustrates a system including a logo detection and business rules engine, in accordance with an embodiment of the disclosure.

FIG. 2 schematically illustrates an embodiment of the disclosure where the network 15 includes a logo detection and rules engine 20 for processing incoming content before that content is accepted by ingest server 16. Although engine 20 is shown separate from ingest server 16, it will be appreciated that the two may operate on the same server hardware. A library of logos is maintained in a storage device 21, for comparison with incoming video content.

Figure 3A:
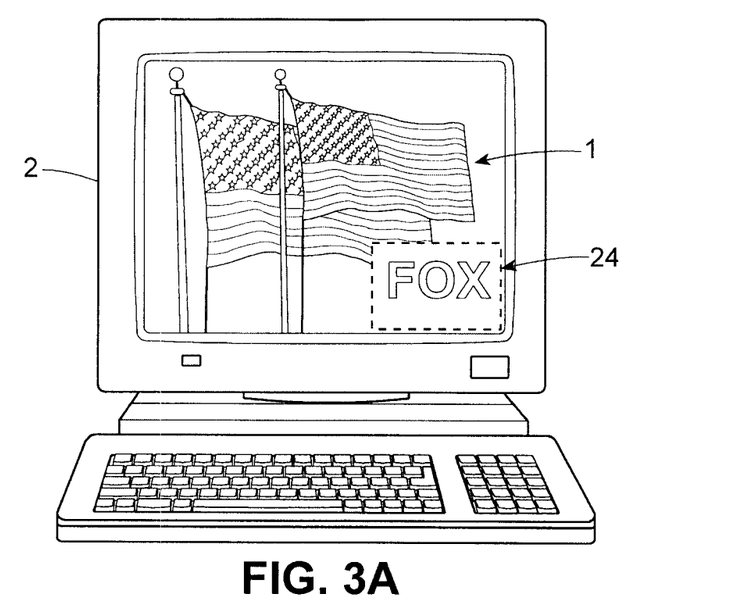
FIGS. 3A and 3B illustrate logos in the form of a digital graphic and human face, respectively.
Figure 3B:
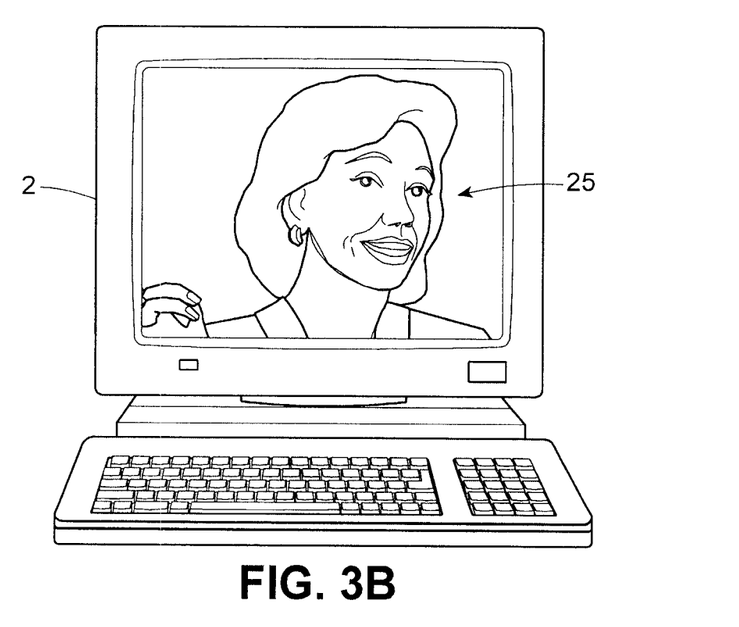

Since most instances of theft of copyrighted content involve premium entertainment content, a wide range of content may be protected by comparing with a relatively small sample size of logos. When the logo is a digital graphic or "bug," the task of finding a logo is simplified by its predictable placement in a corner 24 of a video frame, as illustrated in FIG. 3A. Alternatively, the logo detection may involve recognition of a human face 25 appearing in the frame (FIG. 3B).

Figure 4:
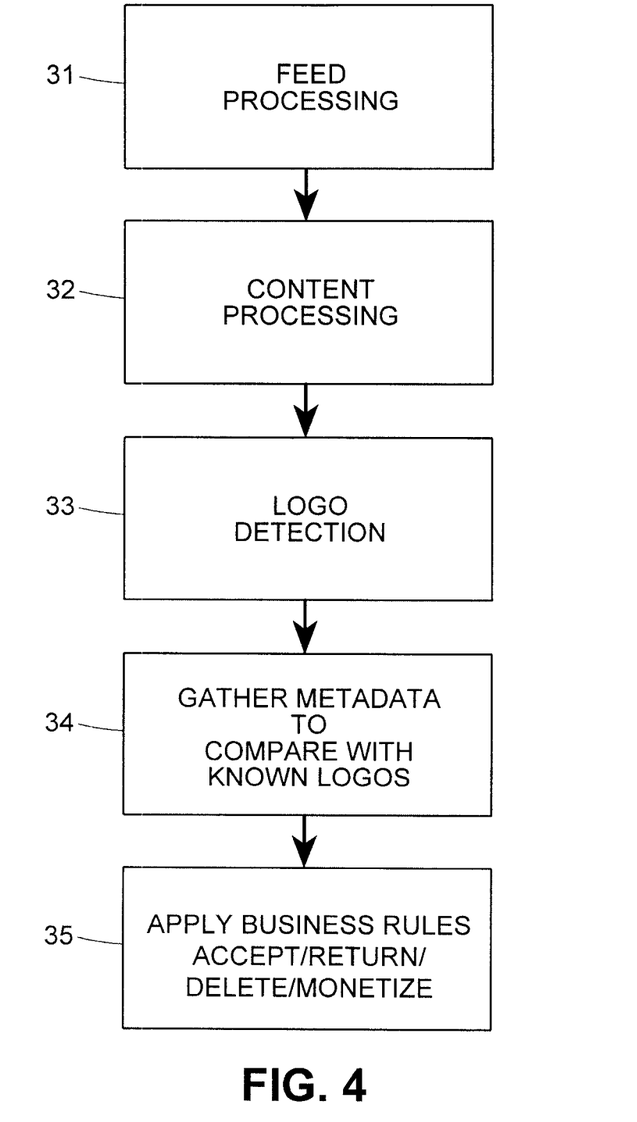
FIG. 4 is a flowchart showing steps in an automated method for detecting copyrighted content, in accordance with an embodiment of the disclosure.

FIG. 4 illustrates steps in a method for detecting a logo using engine 20. The incoming content is fed to the network and staged (step 31). The incoming content then undergoes decompression and transcoding (step 32), e.g. conversion to flash video. The decompressed video, or a portion of it, is then analyzed to detect a logo (step 33). Content analysis techniques such as image recognition may be used to detect the presence of a logo, which may or may not be visible to a human viewer of the content. It is generally not necessary to analyze every frame of the video; the video may be sampled to yield a predetermined number of frames, or a segment of a preselected length may be broken out. For example, it is convenient to analyze a segment about 2½ minutes in length, to overlap the longest expected television commercial break, and thus capture at least some portion of a copyrighted program.

The selected frames or segments are then compared with known logos in predictable spots in each frame (step 34). If a logo is detected in the incoming video, the engine applies business rules (step 35) to determine whether the video content is to be uploaded, discarded, returned to the sender, or uploaded with fees charged to the sender, as discussed in more detail below.

Figure 5:
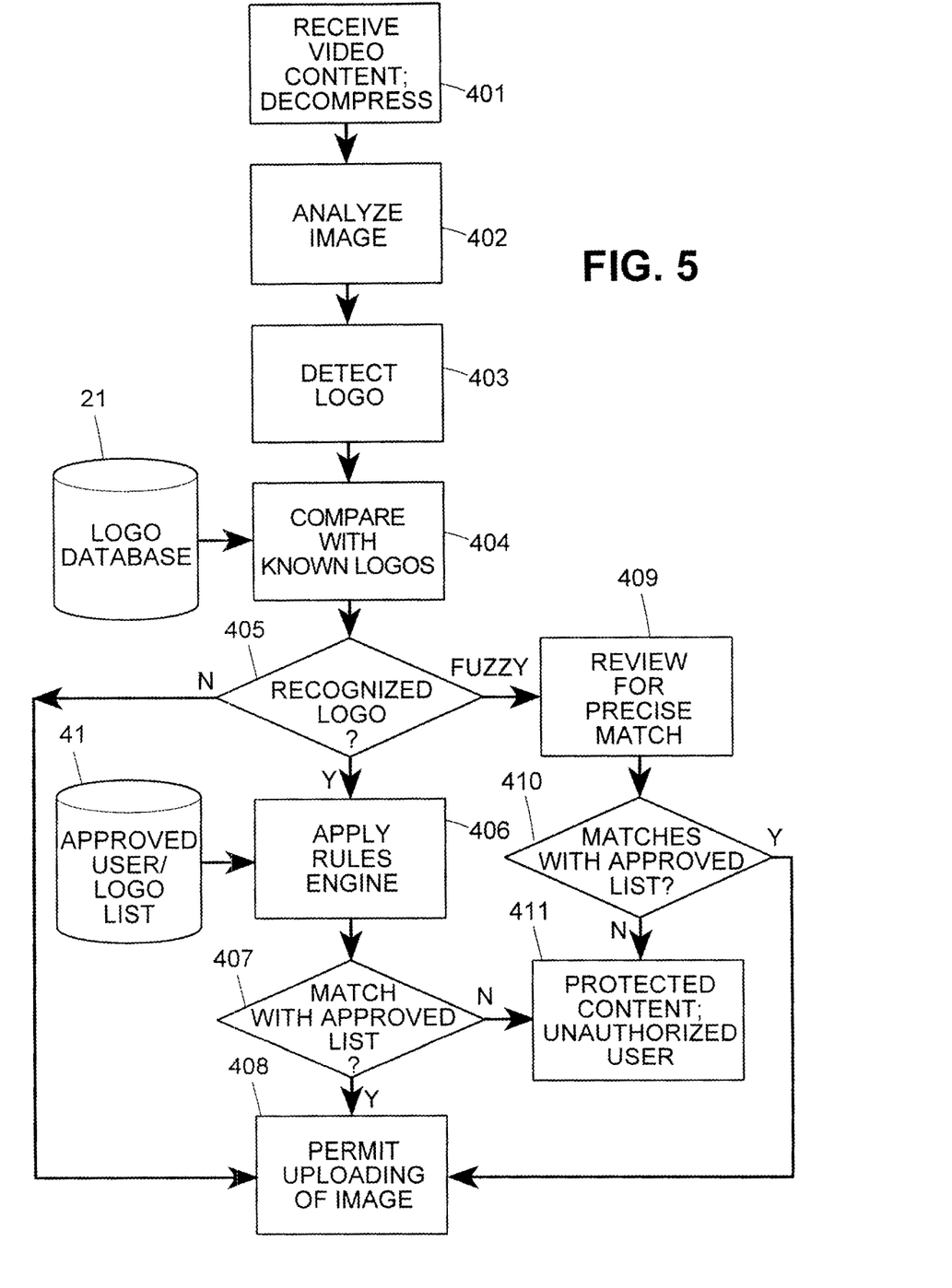
FIG. 5 is a flowchart showing steps in an automated method for detecting a logo and applying relevant business rules, in accordance with an embodiment of the disclosure.

FIG. 5 is a flowchart illustrating additional details of the logo detection and comparison process, according to an embodiment. The video content is received, decompressed and analyzed using content analysis techniques (steps 401, 402). The video content, or a sample thereof, may be analyzed for an on-screen graphic or for some other identifier. Content analysis techniques may include face recognition, voice recognition, OCR, or detection of auxiliary information available in the content (e.g. digital cue-tones indicating broadcast advertising insertion points, or closed caption text recognition). While a logo is often a visible on-screen graphic marking the image (or video frames), automated content analysis techniques are equally effective for logos not visible to the viewer.

Once a logo is detected, it is compared with the sample logos previously provided by the content providers (artists, publishers, distributors, etc.) and stored in database 21 (steps 403, 404). If the logo is clearly identified, that identifying information for the video content is input to a business rules engine for further action (step 405). In an embodiment, the logo may not precisely coincide with one of the sample logos, but may coincide to some predetermined degree; that is a "fuzzy" match with a known logo at, for example, 90% coincidence. If a "fuzzy" match is found, the rules engine may issue a report alerting a human reviewer to the appearance of the logo. The content may then be subjected to other processes, including off-line review (step 409), to determine a more precise match with a known logo.

If no logo is recognized, uploading of the content is permitted (step 408). If the content includes a known logo, the business rules engine determines the disposition of the content (step 406). For example, each known logo may have a list of approved users (aggregators, affiliates, or simply "approved uploaders") associated therewith. If the user attempting to upload the content is on the approved list (step 407, 410), then uploading is permitted. Otherwise, the rules engine determines that the content is protected, and the user submitting the content is unauthorized (step 411).

Figure 6:
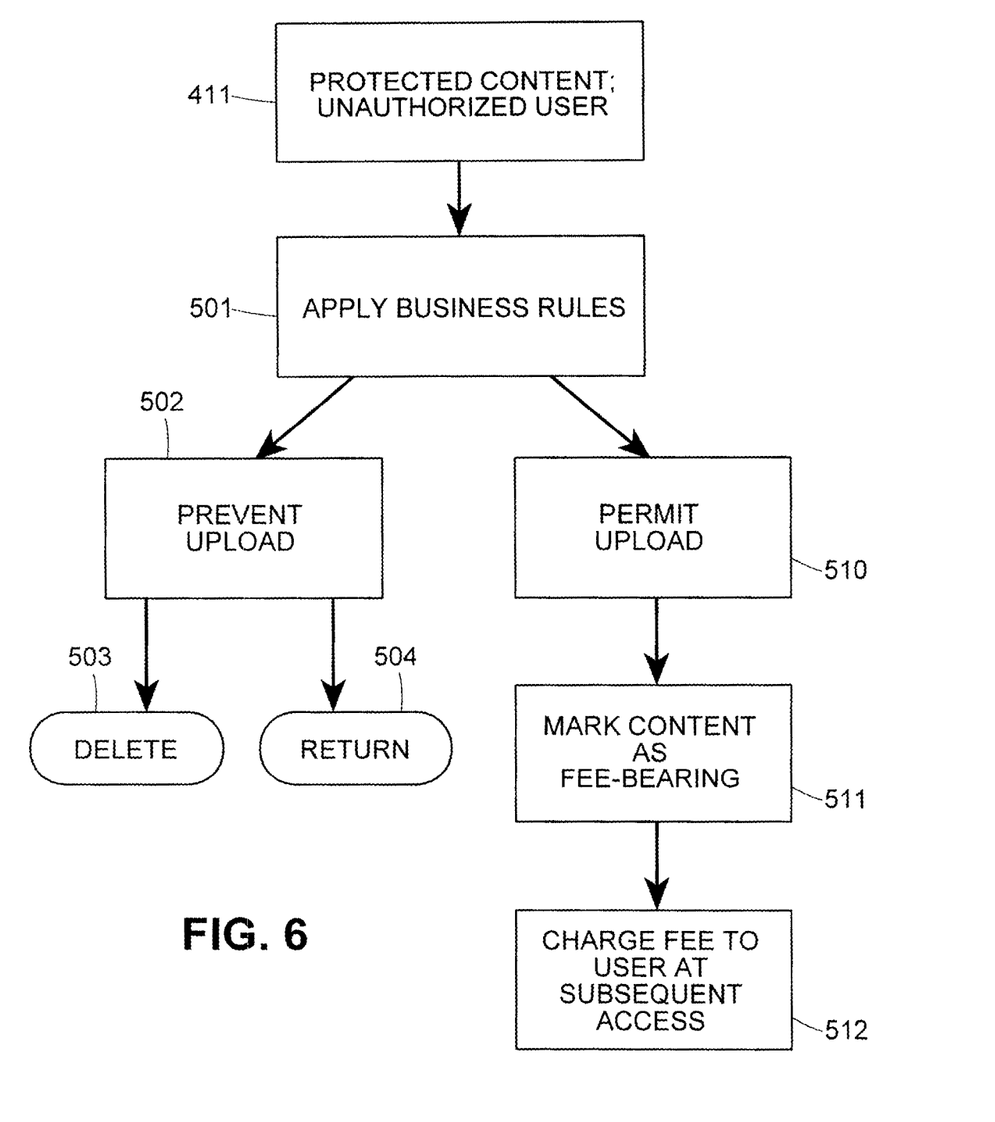
FIG. 6 is a flowchart illustrating an automated business process for enforcing a content owner's copyright, in accordance with another aspect of the disclosure.

The business rules engine may establish several possible ways to dispose of content submitted for upload by an unauthorized user. FIG. 6 is a flowchart schematically illustrating alternative methods of disposing of content. The business rules that are applied (step 501) reflect previously established policies of the particular content owner. At the content owner's direction, the unauthorized upload may be prevented (step 502) or may be permitted (step 503) with conditions imposed on the user. When the upload of the content is prevented, the content may be simply deleted (step 503) or returned to the user (step 504). The engine may also take further action to mark the event (e.g. make an entry in a file, send a message to the content owner, etc.).

Alternatively, the content owner may choose to permit the user to upload its content, in order to derive revenue therefrom (step 510). In an embodiment, the rules engine marks the uploaded content (step 511) and keeps a record of subsequent access of the content by the user. The administrator of network 15 may then charge a fee each time the content is played, thereby providing revenue for the content owner (step 512). In this instance, the rules engine may attach attribution information to the content before it is uploaded.

The rules applied to unauthorized users need not be the same for every content owner, or every item of content. For example, one owner may choose to block all attempted uploads of its content, while another owner may choose to permit uploads of preselected items; a user attempting to upload a popular, recently released movie may be charged a higher fee than for an older movie.

It will be appreciated that the system and method disclosed herein may be used to protect both visual and non-visual (e.g. aural or tonal) copyrighted content. In particular, a tonal logo may be used to identify the owner of video or audio content.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A method comprising:
   receiving, at a content server, a request from a second user to upload a digital content item to a website, the digital content item associated with a first user and comprising digital content, said request comprising an identifier of said second user and a compressed version of the digital content item;
   converting, by the content server, the compressed version of the digital content item into the digital content item by decompressing the compressed version to obtain the digital content item;
   digitally sampling, by the content server, the digital content item to identify a segment of the content item;
   analyzing, by the content server, the identified segment of the digital content item using an automated content analysis technique, and based on said analysis, detecting a portion of the content that references said first user;

analyzing, via the content server, said portion, and based on said analysis, determining that said digital content item is associated with the first user;

comparing, by the content server, upon determination that said digital content item is associated with the first user, said identifier of the second user with a set of identifiers corresponding to authorized users for uploading content to said website, the set of identifiers associated with the first user;

determining, by the content server based on said comparison, whether the second user is authorized to upload said digital content item to said website; and communicating, over a network, an upload instruction to a device of said second user based on said determination.

2. The method of claim 1, wherein said upload instruction facilitates said upload to said website, wherein said determination indicates that said second user is a permitted uploader.

3. The method of claim 1, wherein said upload instruction restricts said upload to said website, wherein said determination indicates that said second user is not a permitted uploader.

4. The method of claim 1, wherein said set of identifiers of authorized users is set by said first user.

5. The method of claim 1, further comprising:
determining a condition for said upload based on said comparison.

6. The method of claim 5, wherein said condition indicates that said digital content item is to be deleted when said second user is not a permitted uploader.

7. The method of claim 5, wherein said condition causes the digital content item to be returned to said first user when said second user is not a permitted uploader.

8. The method of claim 5, wherein said condition is marked as an event when said second user is a permitted uploader, such that the upload causes a message to be sent to the first user alerting the first user of said upload.

9. The method of claim 1, wherein said detected portion comprises a logo associated with the first user, wherein said determination that the first user is an approved provider of said digital content item is based on analysis of said logo compared to logos of approved content providers.

10. A non-transitory computer-readable storage medium tangibly encoded with computer-executable instructions, that when executed by a content server, perform a method comprising:

receiving, at the content server, a request from a second user to upload a digital content item to a website, the digital content item associated with a first user and comprising digital content, said request comprising an identifier of said second user and a compressed version of the digital content item;

converting, by the content server, the compressed version of the digital content item into the digital content item by decompressing the compressed version to obtain the digital content item;

digitally sampling, by the content server, the digital content item to identify a segment of the content item;

analyzing, by the content server, the identified segment of the digital content item using an automated content analysis technique, and based on said analysis, detecting a portion of the content that references said first user;

analyzing, via the content server, said portion, and based on said analysis, determining that said digital content item is associated with the first user;

comparing, by the content server, upon determination that said digital content item is associated with the first user, said identifier of the second user with a set of identifiers corresponding to authorized users for uploading content to said website, the set of identifiers associated with the first user;

determining, by the content server based on said comparison, whether the second user is authorized to upload said digital content item to said website; and communicating, over a network, an upload instruction to a device of said second user based on said determination.

11. The non-transitory computer-readable storage medium of claim 10, wherein said upload instruction facilitates said upload to said website, wherein said determination indicates that said second user is a permitted uploader.

12. The non-transitory computer-readable storage medium of claim 10, wherein said upload instruction restricts said upload to said website, wherein said determination indicates that said second user is not a permitted uploader.

13. The non-transitory computer-readable storage medium of claim 10,
wherein said set of identifiers of authorized users is set by said first user.

14. The non-transitory computer-readable storage medium of claim 10, further comprising:
determining a condition for said upload based on said comparison.

15. The non-transitory computer-readable storage medium of claim 14, wherein said condition indicates that said digital content item is to be deleted when said second user is not a permitted uploader.

16. The non-transitory computer-readable storage medium of claim 14, wherein said condition causes the digital content item to be returned to said first user when said second user is not a permitted uploader.

17. The non-transitory computer-readable storage medium of claim 14, wherein said condition is marked as an event when said second user is a permitted uploader, such that the upload causes a message to be sent to the first user alerting the first user of said upload.

18. The non-transitory computer-readable storage medium of claim 10, wherein said detected portion comprises a logo associated with the first user, wherein said determination that the first user is an approved provider of said digital content item is based on analysis of said logo compared to logos of approved content providers.

19. A content server comprising:
a processor; and
a non-transitory computer-readable storage medium for tangibly storing thereon program logic for execution by the processor, the program logic comprising:
logic executed by the processor for receiving, at the content server, a request from a second user to upload a digital content item to a website, the digital content item associated with a first user and comprising digital content, said request comprising an identifier of said second user and a compressed version of the digital content item;
logic executed by the processor for converting, by the content server, the compressed version of the digital content item into the digital content item by decompressing the compressed version to obtain the digital content item;

logic executed by the processor for digitally sampling, by the content server, the digital content item to identify a segment of the content item;

logic executed by the processor for analyzing, by the content server, the identified segment of the digital content item using an automated content analysis technique, and based on said analysis, detecting a portion of the content that references said first user;

logic executed by the processor for analyzing, via the content server, said portion, and based on said analysis, determining that said digital content item is associated with the first user;

logic executed by the processor for comparing, by the content server, upon determination that said digital content item is associated with the first user, said identifier of the second user with a set of identifiers corresponding to authorized users for uploading content to said website, the set of identifiers associated with the first user;

logic executed by the processor for determining, by the content server based on said comparison, whether the second user is authorized to upload said digital content item to said website; and logic executed by the processor for communicating, over a network, an upload instruction to a device of said second user based on said determination.

\* \* \* \* \*